(12) United States Patent
    Casadio et al.

(10) Patent No.:     US 12,611,612 B2
(45) Date of Patent:        Apr. 28, 2026

(54) SPRAY-DRIER FOR THE PRODUCTION OF ATOMIZED CERAMIC POWDER FROM A WATER SUSPENSION OF CERAMIC MATERIAL

(71) Applicant: SACMI COOPERATIVA MECCANICI IMOLA SOCIETA' COOPERATIVA, Imola (IT)

(72) Inventors: Simone Casadio, Imola (IT); David Costa, Imola (IT); Michele Naldoni, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 0 days.

(21) Appl. No.: 19/102,424

(22) PCT Filed: Aug. 7, 2023

(86) PCT No.: PCT/IB2023/057948
    § 371 (c)(1),
    (2) Date: Feb. 10, 2025

(87) PCT Pub. No.: WO2024/033776
    PCT Pub. Date: Feb. 15, 2024

(65) Prior Publication Data
    US 2025/0256220 A1      Aug. 14, 2025

(30) Foreign Application Priority Data
    Aug. 8, 2022    (IT) ........................ 102022000016980

(51) Int. Cl.
    B01D 1/18          (2006.01)
    B01D 1/02          (2006.01)
    (Continued)

(52) U.S. Cl.
    CPC ................ B01D 1/18 (2013.01); B01D 1/02 (2013.01); B01D 1/14 (2013.01); B01D 1/20 (2013.01)

(58) Field of Classification Search
    CPC ........................................................ B01D 1/18
    See application file for complete search history.

(56) References Cited

U.S. PATENT DOCUMENTS 1,782,054 A * 11/1930 Uhl .......................... B01D 1/18
                                                          159/48.1
2,835,597 A     5/1958 Barzelay
            (Continued)

FOREIGN PATENT DOCUMENTS

CN          107754360          3/2018
CN          107930514          4/2018
            (Continued)

OTHER PUBLICATIONS

International Search Report and Written Opinion mailed for PCT/IB2023/057948 on Oct. 17, 2023, 12 pages.
            (Continued)

*Primary Examiner* — Jonathan Luke Pilcher
(74) *Attorney, Agent, or Firm* — Workman Nydegger

(57)               ABSTRACT

A spray-drier comprising: a main body, which delimits an atomization chamber; a feeding system to feed a water suspension of ceramic material into the atomization chamber, which comprises at least one spraying unit to spray the water suspension of material; a heating system to generate a hot gas flow having a temperature of at least circa 400° C. (in particular, ranging from circa 500° C. to circa 600° C.) using at least one electric heater; and a distribution device for distributing said hot gas flow inside said atomization chamber so that it hits the sprayed water suspension of
            (Continued)

ceramic material, thus drying the solid ceramic material contained therein and generating atomized ceramic powder.

4 Claims, 5 Drawing Sheets

(51) Int. Cl.
   *B01D 1/14*        (2006.01)
   *B01D 1/20*        (2006.01)

(56)                  References Cited

U.S. PATENT DOCUMENTS

| | | | | | |
|---|---|---|---|---|---|
| 3,616,834 | A | * | 11/1971 | Hansen et al. | B01D 1/18 |
| | | | | | 159/4.06 |
| 5,264,078 | A | * | 11/1993 | Bayliss | F26B 3/12 |
| | | | | | 159/48.1 |

| | | | | |
|---|---|---|---|---|
| 2005/0106553 | A1 | | 5/2005 | Franks |
| 2010/0116294 | A1 | * | 5/2010 | Turok ....................... F26B 3/12 |
| | | | | 134/22.18 |
| 2010/0319538 | A1 | | 12/2010 | Ahman et al. |

FOREIGN PATENT DOCUMENTS

| | | | |
|---|---|---|---|
| GB | 2074828 | | 11/1981 |
| JP | S5874101 | | 10/1981 |
| RU | 2200285 | C2 | 3/2003 |
| RU | 2328948 | C1 | 7/2008 |
| RU | 2494792 | C2 | 10/2013 |
| RU | 175755 | U1 | 12/2017 |
| SU | 737734 | A1 | 5/1980 |
| SU | 827913 | A1 | 5/1981 |
| WO | 2013011167 | | 1/2013 |

OTHER PUBLICATIONS

Office Action received for RU Patent Application No. 2025102290, mailed on May 23, 2025, 7 pages.

* cited by examiner

SPRAY-DRIER FOR THE PRODUCTION OF ATOMIZED CERAMIC POWDER FROM A WATER SUSPENSION OF CERAMIC MATERIAL

CROSS-REFERENCE TO RELATED APPLICATIONS

The present application is a 37 U.S.C. § 371 U.S. National Stage of PCT Patent Application No. PCT/IB2023/057948 filed Aug. 7, 2023, which claims priority from Italian Patent Application No. 102022000016980 filed on Aug. 8, 2022. The entire disclosure of each of the foregoing patent applications is incorporated herein by reference.

TECHNICAL FIELD

This invention is related to the field of the manufacture of ceramic products, such as, for example, tiles, ceramic slabs, dish ware, toilets, etc. In particular, this invention is applicable to the field of processing a water suspension of ceramic material, also known as barbotine, in order to obtain atomized ceramic powder.

BACKGROUND OF THE INVENTION

In the field of the production of ceramic articles, it is known to produce at least part of the atomized ceramic powder using spray-driers designed to produce a granular material with suitable particle size features and residual humidity that make it suitable for forming ceramic articles, in particular basically flat ceramic articles, such as, for example, ceramic tiles and slabs. A known spray-drier typically comprises a main body that defines an atomization chamber inside of which the processing of the above-mentioned water suspension of ceramic material (so-called barbotine) takes place to obtain atomized ceramic powder, which is then sifted and stored in special deposit silos, from where it is withdrawn to be used after an ageing period such as to allow the uniform distribution of the humidity and temperature values among the granules of this atomized ceramic powder.

In still more detail, the spray-drier comprises: a feeding system configured to feed jets of water suspension of ceramic material at high pressure inside the atomization chamber, generally via multiple nozzles; a heating assembly, typically consisting of a natural gas, LPG, or liquid fuel burner, to provide heat and heat the air so as to produce a flow of hot air that has a temperature ranging between approximately 500° C. to 600° C.; and a hot air distributor placed at the top of the atomization chamber and configured to receive the flow of hot air from the heating assembly and distribute this hot air flow inside the atomization chamber according to certain paths, for example, by inducing the hot air to move with a swirling motion, so that the water suspension of ceramic material, sprayed from the nozzles, and the hot air flow, suitably distributed, meet and form atomized ceramic powder and discharge fumes, destined to be emitted into the atmosphere via a discharge chimney after having been suitably filtered and/or reduced, for example using separator cyclones, bag filter scrubbers, etc. The atomized ceramic powder, instead, once dried, falls downwards and is discharged via a discharge belt towards subsequent processing stations.

These spray-driers, though offering excellent performance, have some drawbacks, mainly relating to the environment and energy.

In a system for producing ceramic products, the spray-drier is, in fact, one of the most critical machines, together with the furnace, in terms of the environment and energy use since it is one of the machines that requires the greatest quantity of incoming energy and is responsible for the production of a large part of the carbon dioxide produced in the whole ceramic product production system, in particular approximately 30% of the total carbon dioxide produced by a system for manufacturing ceramic products.

The problems connected to carbon dioxide emissions are combined with the recent issues linked to growing difficulties in sourcing raw materials, such as fossil fuels, etc.

The purpose of this invention is to provide a spray-drier that makes it possible to overcome, at least in part, the drawbacks of the prior art and that, at the same time, ensures similar performance to the known spray-driers.

SUMMARY

In accordance with this invention, a spray-drier for the production of atomized ceramic powder from a water suspension of ceramic material is provided, according to what is claimed in the appended independent claim, and preferably, in any one of the claims depending directly or indirectly on the above-mentioned independent claims.

The claims describe preferred embodiments of this invention forming an integral part of this description.

BRIEF DESCRIPTION OF THE DRAWINGS

The invention is described below with reference to the accompanying drawings that show some non-limiting embodiments of it, wherein:

FIGS. 4, 4A, 5, and 6 are schematic views of three different possible electric heater devices.

DETAILED DESCRIPTION

In the attached figures, the reference number 1 denotes, as a whole, a spray-drier for the production of atomized ceramic powder CPA from a water suspension of ceramic material, also known in the sector as barbotine.

Specifically, advantageously but not limitatively, this water suspension of ceramic material comprises a quantity ranging between approximately 30% and approximately 40% (in particular, approximately 33%; more in particular, approximately 32%) by weight of water and the remaining part (in particular, at least approximately 67% by weight) of solid ceramic material. Advantageously but without imposing limits, the solid ceramic material comprises (in particular, consists of) clay, kaolin, feldspar, quartz sand and/or a combination thereof. Still more advantageously but not limitatively, this water suspension of ceramic material has a density that can vary from approximately 1600 g/l to approximately 1750 g/l and a kinematic viscosity that can vary from approximately $5.0 \times 10^{-6}$ m$^2$/s to approximately $3.0 \times 10^{-5}$ m$^2$/s.

Figure 1:
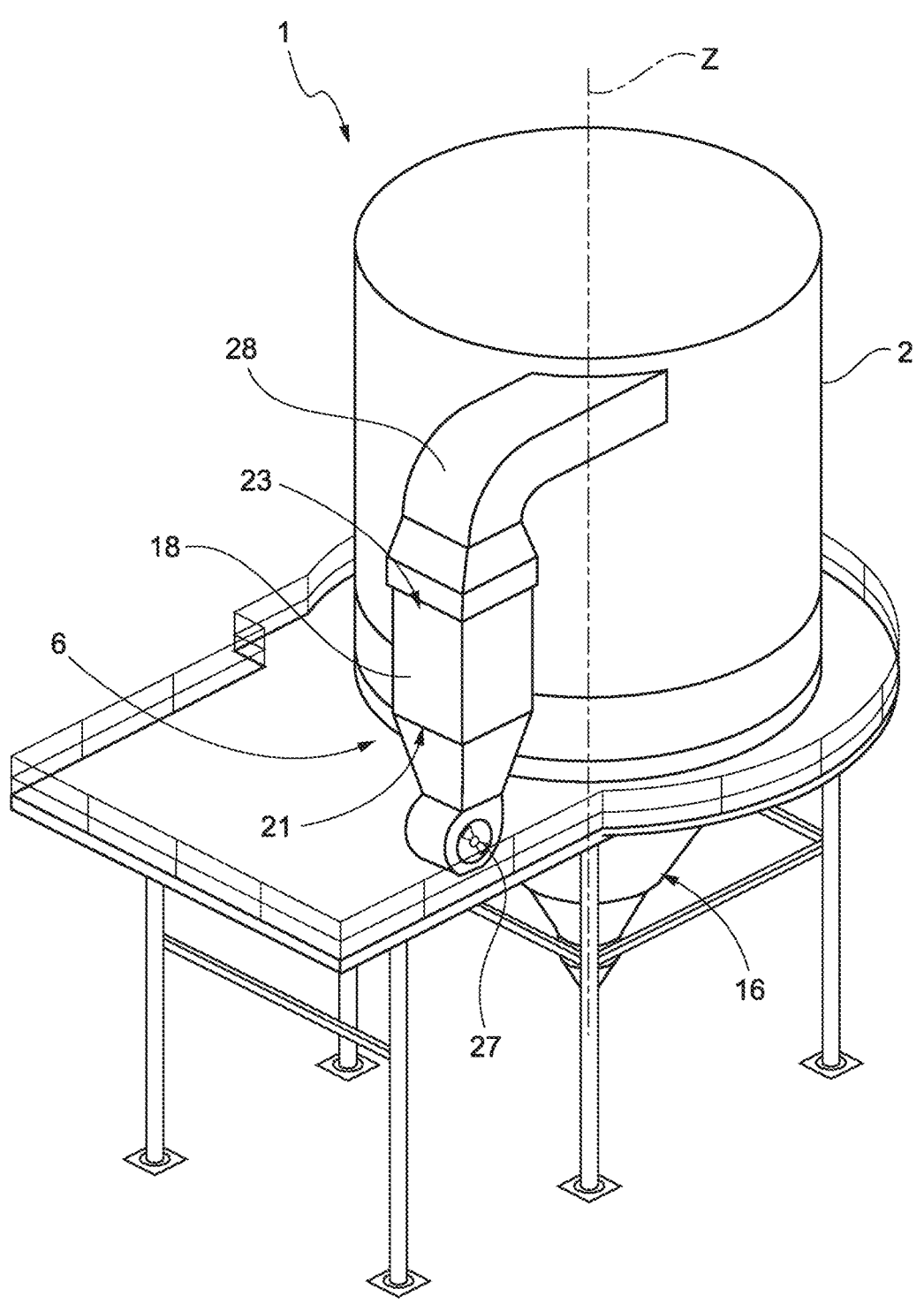
FIG. 1 is a schematic perspective view of a spray-drier in accordance with a first embodiment of this invention.
Figure 2:
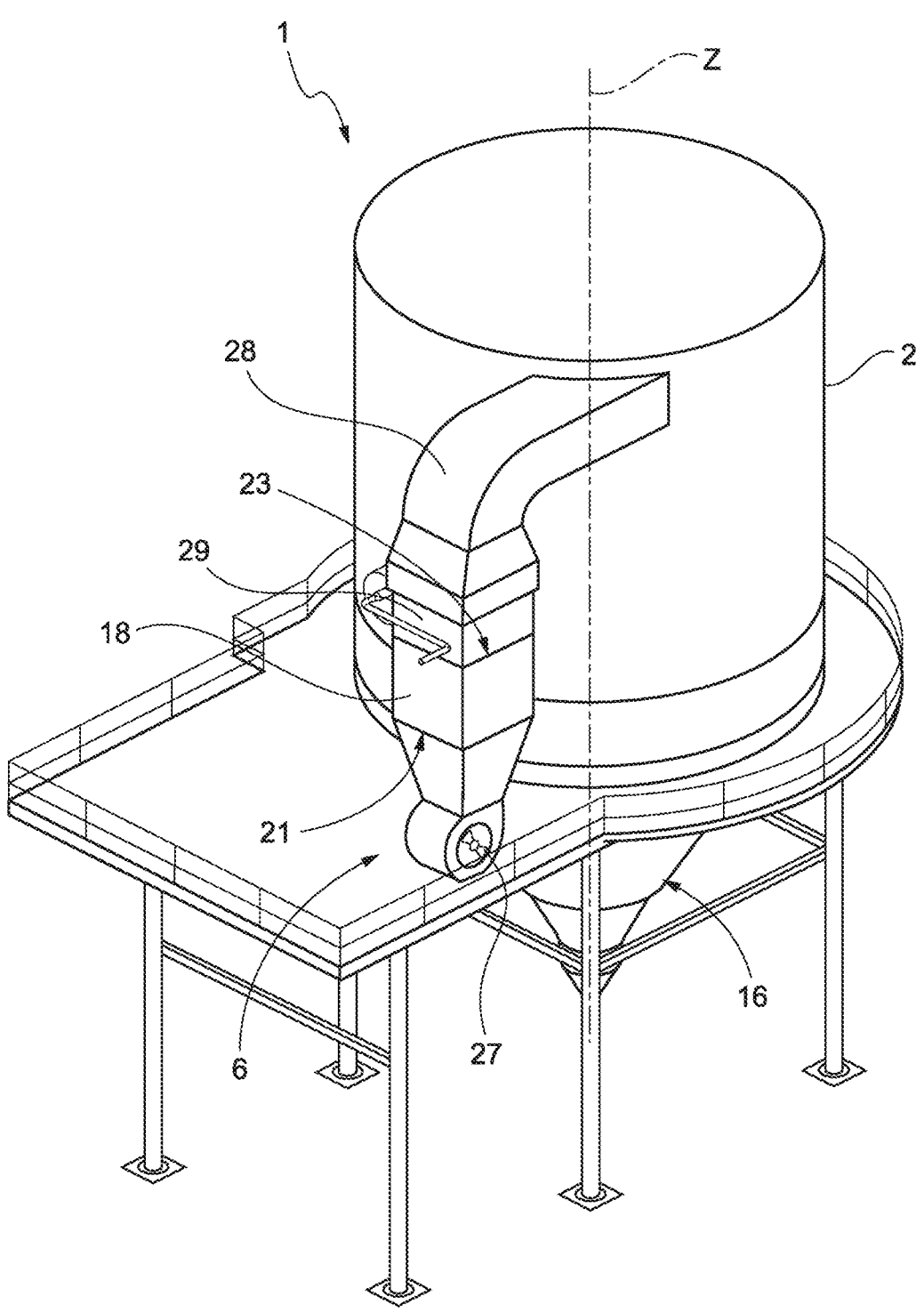
FIG. 2 is a schematic perspective view of a spray-drier in accordance with an additional embodiment of this invention.
Figure 3:
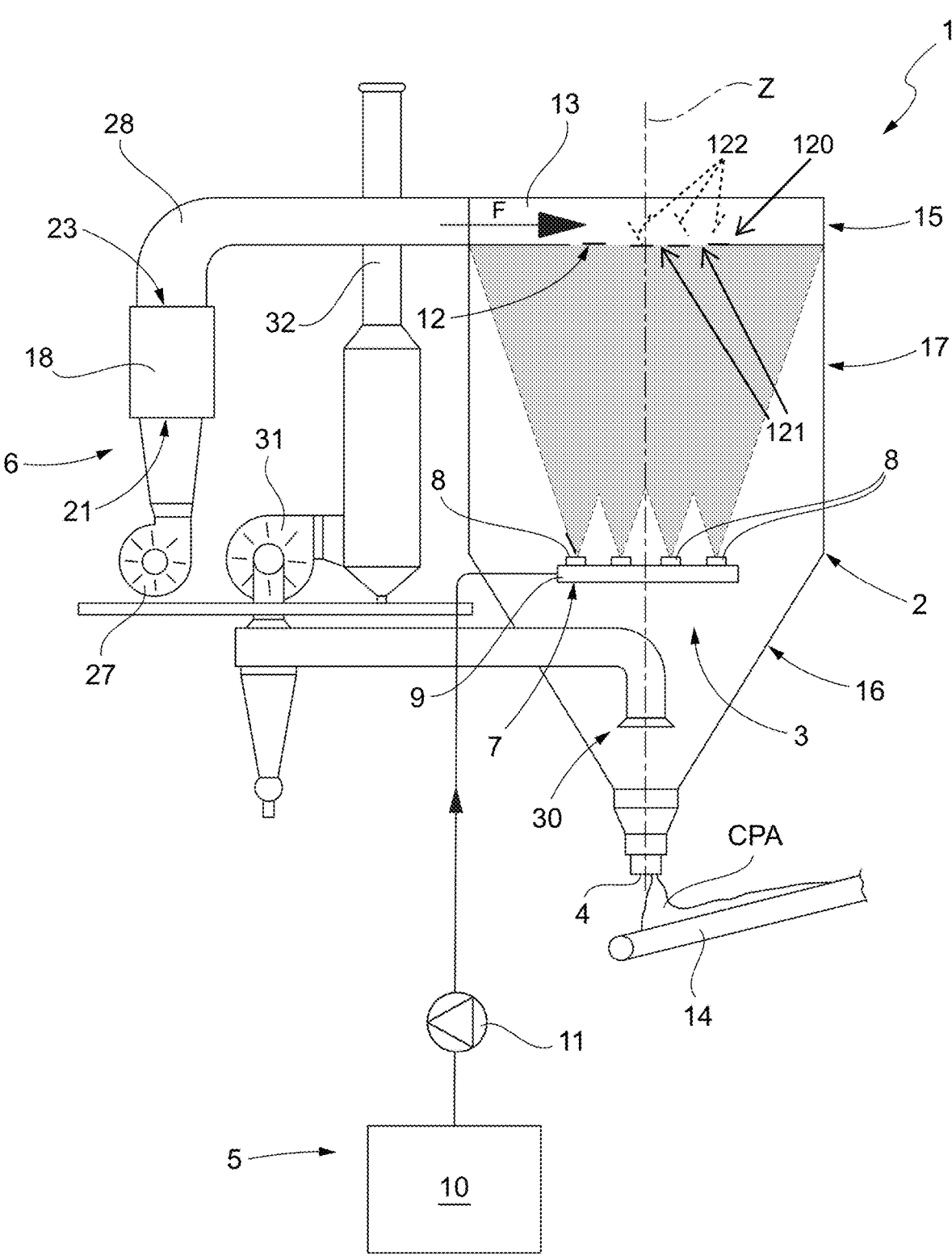
FIG. 3 is a schematic side view of a spray-drier of the type represented in FIG. 1.

With particular reference to FIGS. 1 to 3, advantageously, the spray-drier 1 comprises a main body 2 that delimits an atomization chamber 3 and that comprises at least one discharge outlet 4 configured to allow the atomized ceramic powder CPA to leave the atomization chamber 3, the which ceramic powder CPA, advantageously but without imposing limits, has a water content that can vary from approximately 4% to approximately 7% (in particular, equal to approximately 5%). Advantageously but without imposing limits, the main body 2 of the spray-drier 1 has a symmetry axis Z that is basically vertical.

Advantageously (again with particular reference to FIGS. 1 to 3), the spray-drier 1 also comprises a feeding system 5 (schematically illustrated in FIG. 3) that is configured to feed the above-mentioned water suspension of ceramic material inside the atomization chamber 3 after having suitably sprayed it; and a heating system 6 configured to generate a hot gas flow F that has a temperature of at least approximately 400° C. (in particular, ranging between approximately 500° C. and approximately 600° C.) and to send this hot gas flow F inside the atomization chamber 3 so that the hot gas flow F meets the sprayed water suspension of ceramic material causing the solid ceramic material contained in it to dry and generating atomized ceramic powder CPA.

In particular (advantageously but not limitatively), the feeding system 5 comprises at least one spraying unit 7, advantageously arranged inside the atomization chamber 3, and configured to spray the water suspension of ceramic material and send this sprayed water suspension of ceramic material inside the atomization chamber 3 so as to form a rain of very fine drops of water suspension of ceramic material.

According to some advantageous but non-limiting embodiments, like that illustrated in FIGS. 1 to 3, the spraying unit 7 comprises (in particular, consists of) multiple nozzles 8, each of which is configured to send a jet of water suspension of ceramic material inside the atomization chamber 3 (as schematically illustrated in FIG. 3), advantageously but not limitatively at a speed of at least 15 metres per second (in particular, at a speed that can vary by at least approximately 15 metres per second up to at least approximately 50 metres per second; more specifically, from at least approximately 20 metres per second to at least approximately 40 metres per second) and/or at an inlet pressure that can vary between approximately 15 bar to approximately 30 bar, so as to spray the water suspension of ceramic material and introduce multiple very fine drops of water suspension of ceramic material into the atomization chamber 3.

According to some advantageous but non-limiting embodiments (such as that schematically illustrated in FIG. 3), the spraying unit 7 comprises multiple nozzles 8 arranged along a substantially annular crown (in particular, basically circular), whose centre lies on the symmetry axis Z of the main body 2. In other words, advantageously but not limitatively, the spraying unit 7 comprises multiple nozzles 8 arranged along a closed line that is substantially circular. More specifically, according to some advantageous but non-limiting embodiments (such as that illustrated in FIG. 3), these nozzles 8 are arranged on a fixed support 9 that is circular, is arranged centred in relation to the symmetry axis Z, and, preferably but not necessarily, is made of stainless steel.

According to other advantageous but non-limiting embodiments (such as, for example, that illustrated in FIG. 3A), the nozzles 8 are arranged on straight supports 33, which are also, preferably but not necessarily, made of stainless steel (including said nozzles) connected so as to overhang an inner wall of the main body 2 so as to be equally spaced apart. Still more advantageously but not limitatively, in this case too, these straight supports 33 are arranged along a substantially annular crown, still more advantageously a circular one, whose centre lies on the symmetry axis Z. According to some advantageous but non-limiting variants of this embodiment (i.e. of the embodiment that involves the nozzles 8 arranged on straight supports 33), each of these straight supports 33 is connected rotatably to the inner wall of the main body 2 to be able to rotate on itself, in particular around an axis that extends along the main extension direction of each straight support 33 (still more specifically, around an axis that is basically orthogonal to the symmetry axis Z; more specifically, around an axis that extends in the radial direction in relation to the main body 2). This makes it possible to adjust the emission direction of the jets of water suspension of ceramic material emitted by each nozzle 8, for example as a function of the type of water suspension of ceramic material.

It is understood that the substantially annular crown along which the nozzles 8 are arranged could be basically elliptical, or square, or irregular, as long as it is configured so as to be centred in relation to the symmetry axis Z.

Still more advantageously but not limitatively, the nozzles 8 of the spraying unit 7 are oriented so that the respective water suspension of ceramic material jets are basically vertical and directed upwards (in particular, towards the upper portion of the atomization chamber 3).

Advantageously but not limitatively, the feeding system 5 comprises at least one collection unit 10, for example a basin or tank, a pumping assembly 11, advantageously formed from at least one piston pump, configured to withdraw the water suspension of ceramic material from the collection unit 10 and to pump it with a pressure that can vary from approximately 15 bar to approximately 30 bar to the spraying unit 7 (see FIG. 3).

According to other advantageous but non-limiting embodiments that are not illustrated, the feeding system 5 also comprises a filter interposed between the pumping assembly 11 and the spraying unit 7 to filter the water suspension of ceramic material before introducing it into the atomization chamber 3.

Advantageously, the spray-drier 1 (more specifically, the above-mentioned heating system 6) also comprises a distribution device 12 configured to distribute the hot gas flow F inside the atomization chamber 3 so that it hits the sprayed water suspension of ceramic material, thus drying the solid ceramic material contained therein and generating atomized ceramic powder CPA.

According to some advantageous but non-limiting embodiments, the distribution device 12 comprises (in particular, consists of) at least one annular guide duct 13 configured to impart a swirling motion to the hot gas flow F in a spiral around the symmetry axis Z so as to enable the correct dehydration of the water suspension of ceramic material that meets, i.e. that, in use, is hit by this hot gas flow F, and to obtain an atomized ceramic powder CPA having certain features in terms of particle size and/or humidity.

Still more advantageously but not limitatively, the distribution device 12 comprises at least one annular guide duct 120 having multiple openings 121 to send the hot gas flow F towards the atomization chamber 3; multiple spiral-shaped ducts 122 (centred in relation to the symmetry axis Z), and multiple deflectors 122 to guide the hot gas flow F towards the multiple openings.

Figure 3A:
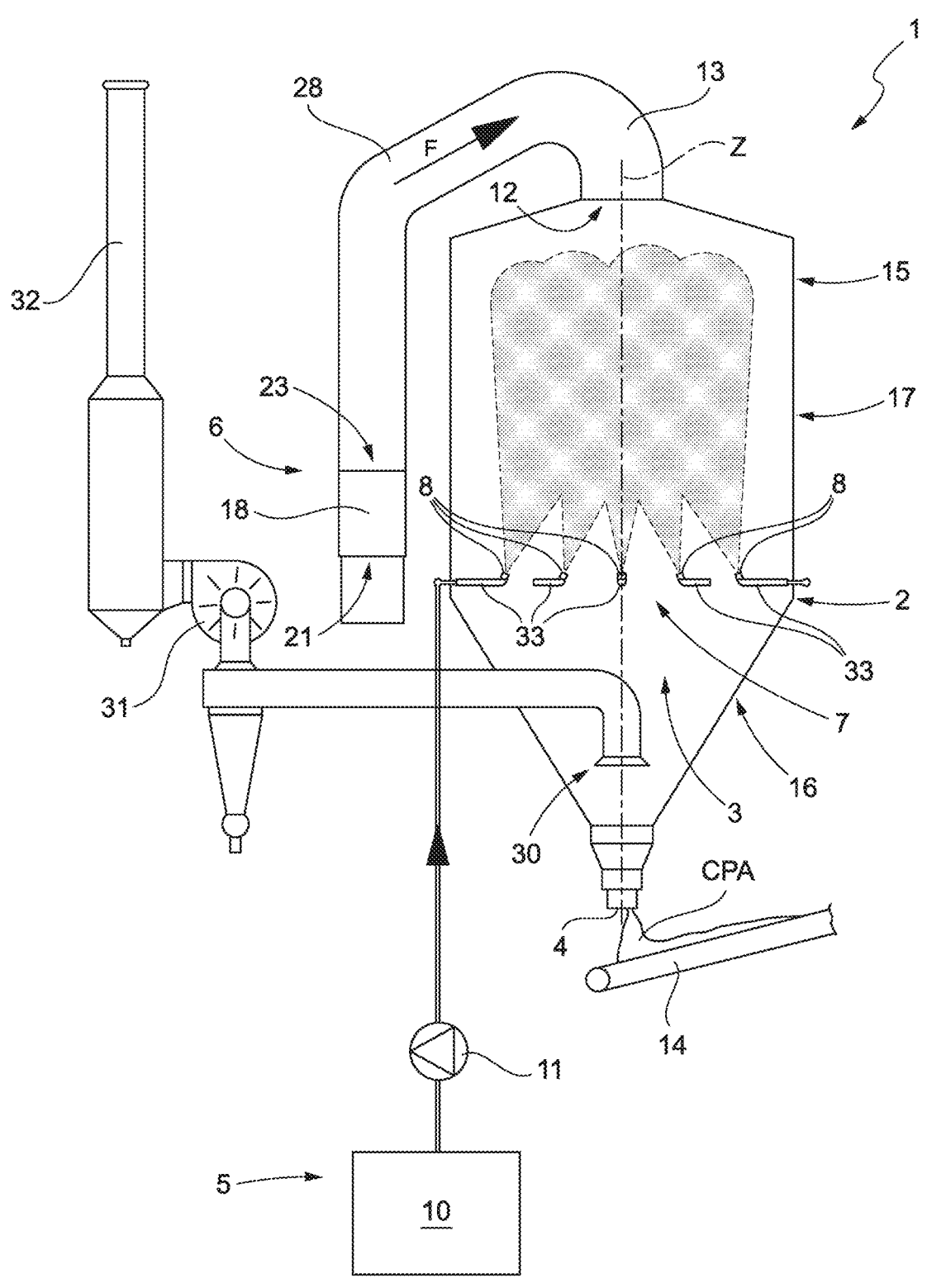
FIG. 3A is a schematic side view of a spray-drier in accordance with an additional embodiment of this invention.

According to alternative, advantageous but non-limiting embodiments, such as that illustrated in FIG. 3A, the spray-drier 1 (in particular, the distribution device 12) comprises a suction system 30, which, advantageously, is in fluidic connection with the atomization chamber 3, comprises, in turn, at least one aspirator 31, and is configured to distribute the hot gas flow F inside the atomization chamber 3. Specifically, advantageously but not limitatively this suction system 30 is configured to pressurise the hot gas flow F fed by the heating system 6 and to impart a swirling motion to this hot gas flow F in a spiral around the symmetry axis Z so as to enable the correct dehydration of the water suspension of ceramic material that meets, i.e. that, in use, is hit by this hot gas flow F, and to obtain an atomized ceramic powder CPA having features in terms of particle size and/or humidity. Advantageously but not limitatively, the discharge outlet 4, via which this atomized ceramic powder CPA leaves the atomization chamber 3, comprises (in particular, consists of) a discharge valve, which is known and not described or illustrated further here, configured to enable the controlled discharge of the atomized ceramic powder CPA. In addition, according to some advantageous but non-limiting embodiments (such as that schematically illustrated in FIG. 3), the spray-drier 1 also comprises at least one conveyor 14 that extends below the discharge outlet 4 and is configured to receive the atomized ceramic powder CPA from the discharge outlet 4 and convey it away from the spray-drier 1.

According to some advantageous but non-limiting embodiments, such as those illustrated in FIGS. 1, 2, and 3, the main body 2 comprises an upper portion 15 that is basically cylindrical, a lower portion 16 that is basically a truncated cone, and a central portion 17 that is basically cylindrical that is interposed without gaps between the upper portion 15 and the lower portion 16 and that delimits the atomization chamber 3 (see, in particular, FIG. 3). In this case, advantageously but without imposing limits, the above-mentioned distribution device 12 is arranged at the upper portion 15, the spraying unit 7 is arranged along an interface section (i.e., transition section) between the lower portion 16 and the central portion 17 and the discharge outlet 4 is arranged at one end of the second, lower portion 15, arranged on the opposite part (i.e., on the opposite side) compared to the central portion 16.

As already mentioned above, according to some advantageous but non-limiting embodiments, the spraying unit 7 is configured to send the sprayed water suspension of ceramic material in the form of vertical jets directed towards the distribution device 12; specifically, towards the upper portion 15; still more specifically, upwards. In addition or alternatively, advantageously but without imposing limits, the distribution device 12 is configured to direct the above-mentioned hot gas flow F in the opposite direction, thus towards the lower portion 16 (in particular, downwards). In this way, it is possible to increase the time that the water suspension of ceramic material (and, more specifically, the solid ceramic material) remains in the atomization chamber 3. This, the water suspension of ceramic material, in fact is initially projected upwards in the opposite direction (thus, in counter current) in relation to the hot gas flow F and then, once it reaches the highest end of the central portion 17, it re-crosses the atomization chamber 3 downwards, thus in the same direction as the hot gas flow F, substantially increasing the efficiency of the spray-drier in terms of thermal exchange.

In this discussion, the terms "high", "low", "upper" and "lower" are used with reference to the spray-drier 1, which has a longitudinal symmetry axis Z, and which rests on the ground so that the longitudinal symmetry axis Z is basically perpendicular to the ground (as illustrated in FIGS. 1, 2, and 3).

According to some advantageous but non-limiting embodiments, the main body 2 comprises (in particular, is made of) stainless steel, still more advantageously but without imposing limits, insulated with high-density mineral wool.

Advantageously, the above-mentioned heating system 6 comprises (in particular, consists of) at least one electric heater 18.

This makes it possible to reduce the carbon dioxide emissions and obtain significant energy savings, with the same performance. Advantageously, in fact, this electric heater 18 has a yield that reaches 95% (in particular, a yield that can vary from approximately 80% to approximately 90%).

Figures 4, 4A, 5, 6:
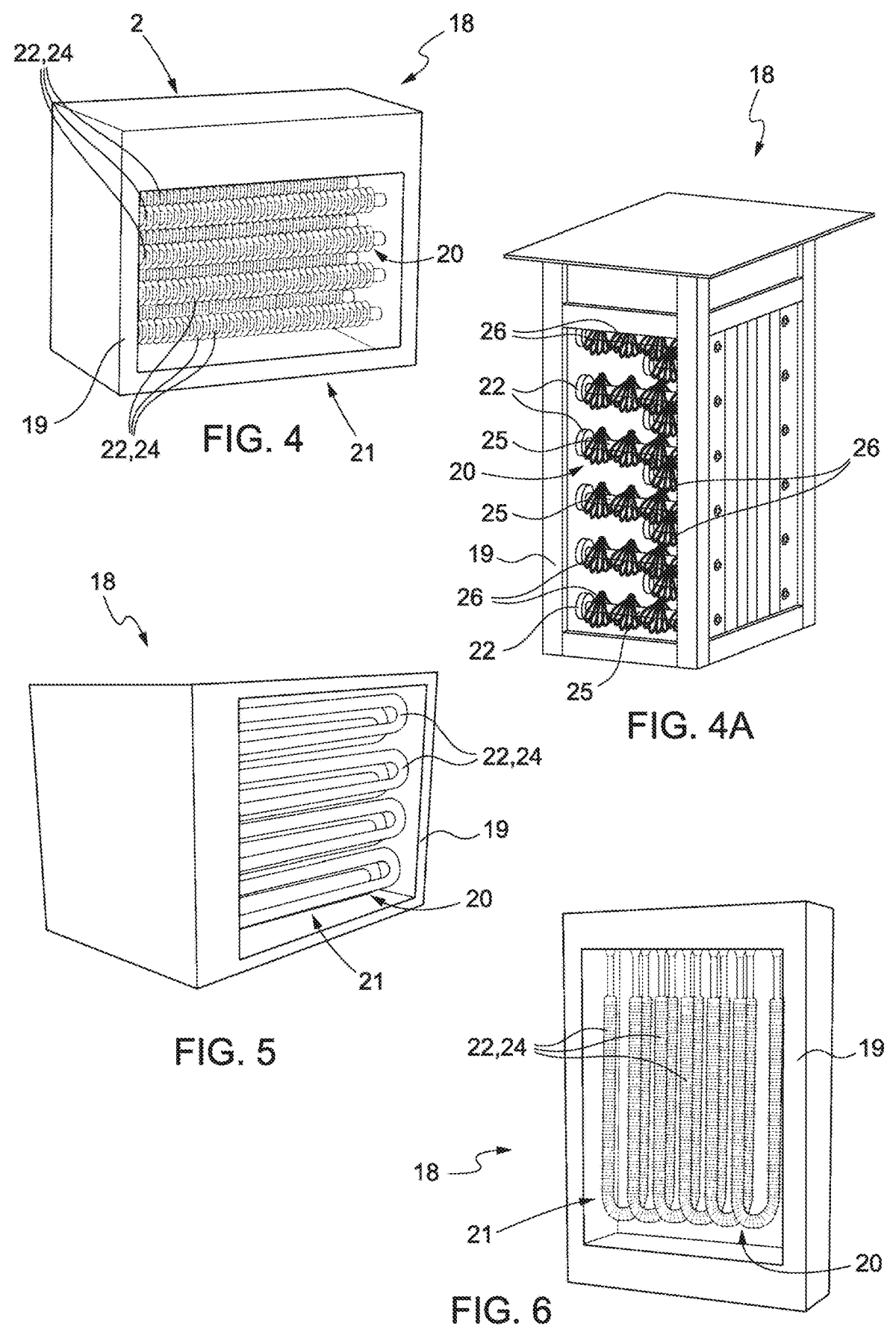

According to some advantageous but non-limiting embodiments of this invention, such as those illustrated in FIGS. 4, 5, and 6, this electric heater 18 comprises, in turn: an outer casing 19 that delimits a heating chamber 20; an inlet 21 for feeding a gas inside the heating chamber 20; multiple electric heating elements 22 that extend inside the heating chamber 20 and are configured to transfer heat by Joule effect to this gas that is found (i.e. passes) inside the heating chamber 20 so as to generate the above-mentioned hot gas flow F; and a discharge outlet 23 that is configured to enable the discharge of the hot gas flow F from the heating chamber 20 and is placed in fluid communication with the distribution device 12.

According to some advantageous but non-limiting embodiments (such as those illustrated), the inlet 21 and the discharge outlet 23 face each other and the electric heating elements 22 are interposed between the inlet 21 and discharge outlet 23 so as to be crossed (or struck) by the gas to be heated. In this way, this gas to be heated will be heated while it passes through the heating chamber 20 through these electric heaters 22.

Advantageously but without imposing limits, the electric heater 18 is configured to heat a gas flow that can vary from approximately 4000 m³/h to approximately 200000 m³/h (in particular, from approximately 30000 m³/h to approximately 200000 m³/h; more in particular from approximately 30000 m³/h to approximately 80000 m³/h; still more advantageously equal to approximately 50000 m³/h) to generate the above-mentioned hot gas flow F.

According to some advantageous but non-limiting embodiments, this gas comprises (in particular, consists of) ambient air having at least 14% oxygen. Alternatively or in combination, the gas to be heated comprises (in particular, consists of) recovered gas.

According to some advantageous but non-limiting embodiments, the outer casing 19 of the electric heater 18 has a basically parallelepiped cross-section, for example a rectangular-shaped parallelepiped cross-section having the following dimensions: 3000×2000×3000.

According to some advantageous but non-limiting embodiments of this invention, at least part of these multiple electric heating elements 22 comprise (in particular, are made of) electric resistances 24 that extend inside the heating chamber 20.

According to some advantageous but non-limiting embodiments, these electric resistances 24 are coil shaped (see, for example, FIG. 5 or 6). Alternatively, these electric resistances are shaped like a spiral (see, for example, FIG. 4).

In addition, according to some advantageous but non-limiting embodiments, these electric resistances are smooth, preferably but without limits, reinforced (see, for example, FIG. 5).

According to other advantageous but non-limiting embodiments, the electric resistances have fins (see, for example, FIG. 6). This makes it possible to increase the size of the heat exchange surface, increasing the thermal efficiency of the spray-drier 1.

Alternatively or in addition, advantageously but not limitatively, at least part of these multiple electric heating elements 22 comprise (in particular, consist of) an oblong resistive element 25, preferably but not necessarily, made of aluminium and/or ceramic, and a metal cover 26 that has a three-dimensional net-like structure, for example like a basket, and is arranged to at least partially wrap around, on the outside, this oblong resistive element 25 and to heat, by Joule effect, the gas that is found (i.e. that passes) inside the heating chamber 20. More advantageously but not limitatively, the metal cover 26 comprises (in particular, consists of) a wire comprising (in particular, made of) an iron-chrome-aluminium alloy or a nickel-chrome aluminium (more advantageously but without imposing limits, an iron-nickel-chrome alloy) or a combination thereof.

According to some advantageous but non-limiting embodiments, in this case, the electric heater 18 comprises (in particular, is) a known, electric air heating module.

According to some advantageous but non-limiting embodiments like that illustrated in FIGS. 1, 2, and 3, the heating system 6 comprises at least one pressurization fan 27 configured to suck the above-mentioned gas (in particular, from the outside) and convey it towards the inlet of the electric heater 18 so as to circulate the gas to be heated inside the heating chamber 20; and a duct 28 interposed between the electric heater 18 and the distribution device 12 and configured to feed the hot gas flow F to the distribution device 12. Advantageously but without imposing limits, this duct 28, has an inlet section tangential to the main body that is basically cylindrical (see FIGS. 1, 2, and 3).

According to other advantageous but non-limiting embodiments, like that illustrated in FIG. 3A, the spray-drier 1 comprises a duct 28 interposed between the electric heater 18 and the main body 2 to feed the hot gas flow F to the atomization chamber 3, where this hot gas flow F is pressurized by the above-mentioned suction system 30, in particular by the aspirator 31, without needing the fan 27. In this case, advantageously but without imposing limits, the duct 28 is grafted onto the top of the cylindrical main body 2 (in particular, to the top of the basically cylindrical upper portion 15) to send the hot gas flow F into the atomization chamber 3 (see FIG. 3A). Advantageously but not limitatively, the duct 28 is made of steel, more advantageously it is insulated.

The use of a heating system 6 with electric heaters 18 of the type described above, significantly reduces the transmission of heat by radiation. This enables, among other things, the reduction of the amount of insulation necessary in the duct 28 to approximately 25%.

According to some advantageous but non-limiting embodiments, the heating system 6 comprises (in particular, consists of) multiple electric heaters 18 arranged in series, each of which is, advantageously but without imposing limits, made according to any of the embodiments described above.

According to some advantageous but non-limiting embodiments, like that schematically illustrated in FIG. 2, the heating system 6 also comprises a standard burner 29, for example using known fossil fuels (gas or liquid). In this case, advantageously but not limitatively, the gas to be heated first passes through the electric heater 18 and then through the standard burner 29. This enables greater control of the temperatures and volume of the hot gas flow F that is sent into the atomization chamber 3.

According to some advantageous but non-limiting embodiments, like those illustrated in FIGS. 3 and 3A, the spray-drier 1 comprises, in addition, a fume expulsion system 30 to eliminate discharge fumes from the atomization chamber 3 that are generated once the water suspension of ceramic material has dried. This expulsion system 30 is configured to convey these discharge fumes leaving the spray-drier 1, and to filter them and/or reduce them.

According to some advantageous but non-limiting embodiments, this expulsion system 30 comprises at least one aspirator 31 that sucks up these discharge fumes, at least one filtering and/or reduction device, for example a bag filter, to filter these discharge fumes, and a chimney 32 to send these fumes into the external environment.

According to some advantageous but non-limiting embodiments, such as that illustrated in FIG. 3A, this fume expulsion system 30 is at least in part the same as the above-mentioned suction system 30.

According to an additional aspect of this invention, a production method for atomized ceramic powder CPA from a water suspension of ceramic material (advantageously but not limitatively made as described above in relation to the spray-drier 1) via the atomisation of the water suspension of ceramic material using a spray-drier 1 is provided, advantageously made as described above.

More specifically, advantageously but not limitatively, the production of atomized ceramic powder CPA occurs by spraying a water suspension of ceramic material that comprises (in particular, consists of) at least approximately 30% (in particular, at least approximately 32%) by weight of water and the remaining part of solid ceramic material. Specifically, as already mentioned above in relation to the spray-drier 1, advantageously but not limitatively, the solid ceramic material comprises (in particular, consists of) clay, kaolin, feldspar, quartz sand and/or a combination thereof. Still more advantageously but without imposing limits, this water suspension of ceramic material has a density that can vary from approximately 1600 g/l to approximately 1750 g/l and a kinematic viscosity that can vary from approximately $5.0 \times 10^{-6}$ m$^2$/s to approximately $3.0 \times 10^{-5}$ m$^2$/s.

Advantageously, the production method for atomized ceramic powder CPA comprises the following steps: a feeding step, during which the above-mentioned feeding system 5 (advantageously but not limitatively carried out according to one of the embodiments described above) feeds (in particular, a defined quantity, i.e. a controlled or measured quantity of) a water suspension of ceramic material to the spray-drier 1 and the spraying unit 7 of this feeding system 5 sprays the water suspension of ceramic material and sends it, sprayed, inside the above-mentioned atomization chamber 3; a heating step, during which the heating system 6 (advantageously but not limitatively, carried out according to any one of the embodiments described above) generates a hot gas flow F that has a temperature of at least approximately 400° C. (in particular, ranging between approximately 500° C. and approximately 600° C.); and a distribution step, during which a distribution device 12 distributes this hot gas flow F inside the atomization chamber 3 so that this hits the sprayed water suspension of ceramic material, thus inducing the drying of the solid ceramic material contained in it and generating atomized ceramic powder CPA.

Advantageously, as already mentioned above in relation to the spray-drier 1, the heating system 6 comprises (in particular, consists of) at least one electric heater 18 (advantageously made according to one of the embodiments illustrated above). More advantageously but not limitatively, in these cases, during the heating step, the electric heater 18 heats a certain quantity of gas to generate the above-mentioned hot gas flow F; more specifically, the electric heater 18 heats a gas flow that can vary from approximately 4000 m³/h to approximately 200000 m³/h (in particular, 30000 m³/h to approximately 200000 m³/h; more in particular from approximately 30000 m³/h to approximately 80000 m³/h; still more in particular equal to approximately 50000 m³/h) to generate the above-mentioned hot gas flow F.

Advantageously but without imposing limits, when the distribution device 12 of the spray-drier 1 used to implement the production method comprises the above-mentioned annular guide duct 13, during the distribution step, the annular guide duct 13 imparts a swirling motion around the symmetry axis Z to said hot gas flow F.

Alternatively or in combination, advantageously but not limitatively, when the distribution device 12 of the spray-drier 1 used to implement the production method comprises a suction system 30, during the distribution step, this suction system 30 imparts a swirling motion around said symmetry axis Z to the hot gas flow F.

Advantageously but not limitatively, the production method also comprises: a gas-feeding sub-step, during which a gas is fed inside the heating chamber 20 of the electric heater 18 through the inlet 21 of this heating chamber 20; a heating sub-step (at least partially) simultaneous to the gas-feeding sub-step, during which the multiple electric heating elements 22 (that, as better explained in relation to the spray-drier 1, are included in the electric heater 18 and) that extend inside the heating chamber 20 transfer heat by the Joule effect to the gas that is found inside the heating chamber 20 and generate, thus, the above-mentioned hot gas flow F; and a gas-discharge sub-step, during which this hot gas flow F leaves the discharge outlet 23 and is transferred to the distribution device 12.

According to some advantageous but non-limiting embodiments, the production method comprises, in addition: a suction step (at least partially) preceding the gas-feeding sub-step, during which a pressurization fan 27, which is part of the heating system 6, sucks the (in particular, a certain quantity/flow of) gas and conveys it towards the inlet 21 of the electric heater 18; and a transfer step (at least partially) simultaneous to the gas-discharge sub-step, during which the hot gas flow F coming out of the discharge outlet 23 crosses (in particular, moves through) the duct 28 interposed between the electric heater 18 and the distribution device 12.

The spray-drier 1 and the production method for producing atomized ceramic powder CPA described above has numerous advantages, of which we cite the following.

The use of a heating system 6 comprising (in particular, consisting of) an electric heater reduces the CO2 emissions and energy consumption, with the same performance in terms of volume of hot gas sent into the atomization chamber 3 and of the temperature of this hot gas flow F.

In addition, the heating system 6 described above is easily adapted to the structure of prior art spray-driers equipped with gas or liquid fuel burners.

It should be noted, finally, that the use of an electric heater 18 of the type described above, compared to the use of gas or liquid fuel burners used in the prior art solutions, reduces the water content (the water being eliminated, as a matter of fact, as a waste product of the combustion) encouraging the drying of the sprayed water suspension of ceramic material and, thus, the production of atomized ceramic powder CPA and reducing energy consumption.

The invention claimed is:

1. A production method for producing atomized ceramic powder from a water suspension of ceramic material using a spray-drier comprising: a main body, which delimits an atomization chamber and comprises at least one discharge outlet configured to let the atomized ceramic powder out of said atomization chamber; a feeding system which, in turn, comprises at least one spraying unit; a heating system comprising at least one electric heater; and a distribution device;

wherein the production method comprises:

a feeding step during which said feeding system feeds a water suspension of ceramic material comprising at least 30% by weight of water and a remaining part of solid ceramic material into said spray-drier and said spraying unit sprays said water suspension of ceramic material and sends it, sprayed, into said atomization chamber;

a heating step, during which said heating system generates a hot gas flow having a temperature of at least 400° C.; and a distribution step, at least partially following said heating step, during which a distribution device distributes said hot gas flow inside said atomization chamber so that it hits the sprayed water suspension of ceramic material, thus drying the solid ceramic material contained therein and generating atomized ceramic powder;

said at least one electric heater comprises:

an outer casing, which delimits a heating chamber; an inlet to feed gas into said heating chamber; a plurality of electric heating elements, which extend inside said heating chamber and are configured to transfer heat, through Joule effect, to said gas located inside said heating chamber, so that it generates said hot gas flow; and a discharge outlet, which is configured to let said hot gas flow out of said heating chamber and is in fluid communication with said distribution device;

wherein at least part of said electric heating elements comprises an oblong resistive element and a metal cover that has a three-dimensional net-like structure and is arranged so as to at least partially wrap, on the outside, said oblong resistive element and heat, through Joule effect, said gas located inside said heating chamber; and wherein said heating step comprises:

a gas-feeding sub-step, during which a gas is fed inside the heating chamber of the electric heater through said inlet;

a heating sub-step at least partially simultaneous to the gas-feeding sub-step, during which the plurality of electric heating elements that extend inside said heating chamber transfer heat, through Joule effect, to said gas that is inside said heating chamber and generate said hot gas flow; and a gas-outlet sub-step, during which said hot gas flow leaves said discharge outlet and is transferred to said distribution device.

2. The production method according to claim 1, further comprising:

a suction step, at least partially preceding said gas-feeding sub-step, during which a pressurization fan, which is part of said heating system, sucks said gas and conveys it towards said inlet of said at least one electric heater; and a transfer step, at least partially simultaneous to said gas-outlet sub-step, during which said hot gas flow coming out of said discharge outlet crosses said duct interposed between said at least one electric heater and said distribution device.

3. The production method according to claim 1, wherein:

the main body of the spray-drier has a substantially vertical symmetry axis;

the spraying unit of the spray-drier comprises a plurality of nozzles arranged along at least one substantially annular crown whose center lies on said symmetry axis;

the distribution device of the spray-drier comprises at least one annular guide duct, which is configured to impart a swirling motion around said symmetry axis to said hot gas flow; and during said distribution step, the annular guide duct imparts a swirling motion around said symmetry axis to said hot gas flow.

4. The production method according to claim 1, wherein:

the main body of the spray-drier has a substantially vertical symmetry axis;

the spraying unit of the spray-drier comprises a plurality of nozzles arranged along at least one substantially annular crown whose center lies on said symmetry axis;

the distribution device of the spray-drier comprises at least one annular guide duct, which is configured to impart a swirling motion around said symmetry axis to said hot gas flow, and comprises a plurality of openings to lead the hot gas flow towards said atomization chamber, a plurality of spiral-shaped ducts and a plurality of deflectors to guide said hot gas flow towards said plurality of openings; and during said distribution step, said suction system imparts a swirling motion around said symmetry axis to said hot gas flow.

* * * * *